United States Patent
Toncelli

(10) Patent No.: US 6,932,549 B2
(45) Date of Patent: Aug. 23, 2005

(54) MANDREL-HOLDING SLIDE OR SLEEVE POD FOR NUMERICAL-CONTROL MACHINE TOOLS

(76) Inventor: Luca Toncelli, Viale Asiago, 34 - 36061 Bassano del Grappa (Vicenza) (IT)

(*) Notice: Subject to any disclaimer, the term of this patent is extended or adjusted under 35 U.S.C. 154(b) by 215 days.

(21) Appl. No.: 10/610,993

(22) Filed: Jul. 1, 2003

(65) Prior Publication Data

US 2004/0168554 A1 Sep. 2, 2004

(30) Foreign Application Priority Data

Jul. 9, 2002 (IT) ..................................... TV2002A0079

(51) Int. Cl.[7] .............................................. B23C 1/06
(52) U.S. Cl. ...................... 409/241; 409/237; 409/238; 409/185; 409/186; 409/232; 408/714; 408/235
(58) Field of Search ................................. 409/237–238, 409/235, 231–232, 184–189, 141, 193–195, 204, 206, 207–208, 214, 241; 82/158, 142; 408/8, 10–13, 143, 714, 154–156, 234–235; 451/343

(56) References Cited

U.S. PATENT DOCUMENTS

| | | | | |
|---|---|---|---|---|
| 2,259,808 A | * | 10/1941 | Ellenbecker | ................ 451/237 |
| 3,146,472 A | * | 9/1964 | Long | .......................... 409/237 |
| 3,526,938 A | * | 9/1970 | Grabher | ...................... 409/241 |
| 5,590,580 A | * | 1/1997 | Nagai | ........................... 92/33 |

FOREIGN PATENT DOCUMENTS

| | | | |
|---|---|---|---|
| EP | 1103339 A1 | * | 5/2001 |
| GB | 2116465 A | * | 9/1983 |

* cited by examiner

Primary Examiner—Erica Cadugan
(74) Attorney, Agent, or Firm—Katten Muchin Rosenman

(57) ABSTRACT

In a numerical-control machine tool use is made of a mandrel-holding structure that makes it possible for the machine tool to be used to smoothing/facing and polishing purposes under utilization of traditional pan-like tools, in which the force acting on the working tool is delivered by a pre-established adjustable pneumatic pressure, while the weight of the moving parts of the mandrel is compensated for by a compression spring. When the pneumatic pressure is substituted for by an oleodynamic, i.e. oil-pressure force acting in the opposite direction, the machine switches over to normal operating conditions as a regular numerical-control machine tool.

3 Claims, 4 Drawing Sheets

MANDREL-HOLDING SLIDE OR SLEEVE POD FOR NUMERICAL-CONTROL MACHINE TOOLS

Figure 1:
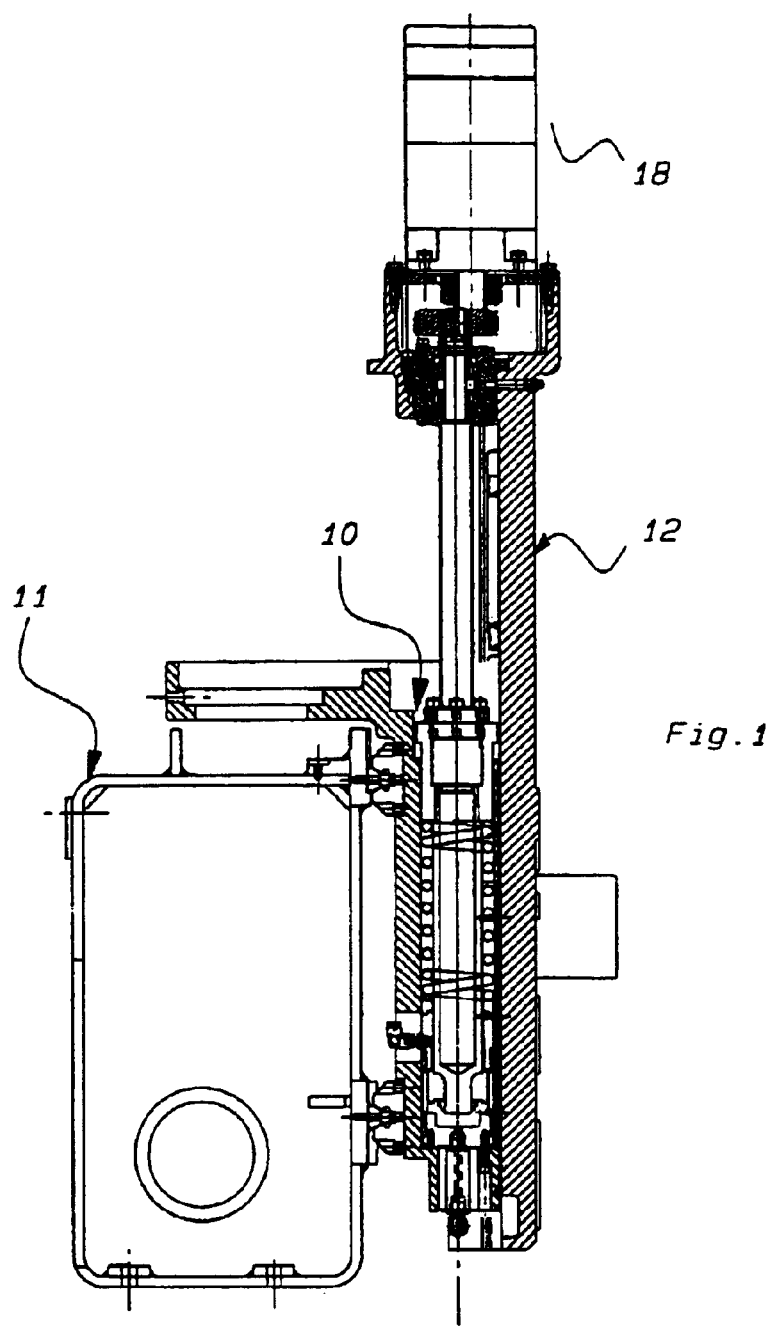

The present invention refers to a mandrel-holding structure, or slide, for a numerical-control machine tool that makes it possible for traditional tool-carrier chucks to be used for working on stone materials, e.g. to the purpose of smoothing/polishing, as well as facing flat surfaces.

These machine tools are generally provided with a usually vertical mandrel, which is usually housed in a structure that is commonly referred to as "sleeve pod", or slide, in the art, which is imparted a linear motion of its own.

This sleeve pod or slide is associated to a mandrel-carrier carriage, which is in turn mounted slidably on a beam. According to the type of machine tool in which it is used, such a sleeve pod may be animated, i.e. driven to accomplish either a vertical motion (such as in the case of the so-called portal-type machines) or a horizontal motion. While reference will be made to portal-type machine tools in the following description, this shall of course by no means be intended as to have a limiting purport. Similarly, while reference will be made to smoothing, facing and polishing operations without any distinction, this shall not be understood as to limiting the scope of the invention in any way.

The mandrel itself is substantially constituted by a structure comprising a rotating shaft, which has, at an end portion thereof, a tool-carrying taper bore (intended to receive the actual working tool for the mounting thereof), and the drive and gear system for transmitting motion from a motor to the shaft.

The kind of processing work that is performed depends of course on the kind of tool that is mounted on to the tool-carrying taper bore of such a mandrel.

As already pointed out above, among the various processing operations which stone materials may be subjected to, a common one implies polishing, smoothing or facing flat surfaces of stone materials.

In the case of traditional polishing or facing machines, i.e. single-purpose machines intended solely to such particular tasks, the mandrels are of the pneumatically or hydraulically-operated kind, in which the tool is pressed downwards against the material to be processed by a force of a pneumatic or fluid nature, depending on the particular medium being used for operation. In this manner, the polishing or facing head rests against the surface to be treated with a force that is equal to the sum of the weight of the head and the pneumatic or fluid pressure being exerted thereon.

On the contrary, in the case of calibrating or sizing machines, the working head is positioned at a fixed (albeit mechanically adjustable) altitude.

In the case of numerical-control machine tools, smoothing is carried out with the use of special tools comprising a body at the end portion of which there is mounted a polishing dish, which is biased elastically by a set of springs against the surface to be smoothed or polished.

As a result, the pressure that is exerted upon the material being processed cannot be constant, since it basically depends on the extent of compression of the springs. If, as this occurs quite frequently, the material features even slight differences in the thickness thereof, the extent of compression of the springs varies accordingly and, with it, also the force with which the tool is pressed against the above-mentioned surface. The ultimate result of such a variation is a surface that is not smoothed in a perfectly uniform and even manner, showing irregularities which can be visible also to the naked eye and cause the finished product to be plainly unacceptable or, anyway, a low-graded one.

In addition, the tool itself is subject to wear-down and unavoidably ends up by causing the afore-mentioned compression of the spring to vary accordingly, with the same ultimate consequences in terms of finished product.

Finally, the fact should not be overlooked that these tools are usually special, i.e. dedicated ones, which are specially designed for smoothing or polishing stone materials and, therefore, rather costly.

Replacing a tool applied on to the smoothing or polishing head owing to its having fully worn off, or owing to its having to be replaced with another tool due to changing processing requirements or needs, has considerable down-time implications which do not fail, of course, to correspondingly affect the overall costs of the industrial process.

It would therefore be desirable to have the possibility for simple tool-carrying chucks or dishes of a traditional type, i.e. of the type used in the normal smoothing and polishing machines mentioned earlier in this description, to be mounted on numerical-control machine tools, instead of having to make use of the special spring-loaded polishing heads described above.

Equally, if not even more desirable is the possibility of providing a mandrel-holding structure or slide for numerical-control machine tools, which has such a construction as to ensure that, in the case of polishing/smoothing operations carried out on stone material, the tool is able to apply on the material being processed a pressure that is independent of both possible thickness differences in the material to be polished or smoothed and the extent of wear-down of the tool, so that the resulting finished product does not show any readily visible unevenness or similar defects.

At the same time, the structure of such a mandrel-holding slide must be such as to ensure that, in all other processing or finishing operations, the numerical-control machine tool is equally able to operate, without any complicate and time-consuming adaptations, with said mandrel-holding slide in a controlled, firmly locked and non-floating position.

It is in fact a main purpose of the present invention to provide a mandrel-holding structure or slide for numerical-control machine tools that is capable of doing away with all afore-cited drawbacks of prior art solutions, while at the same time achieving the afore-mentioned advantages.

This aim is reached with a mandrel-holding structure or slide that has the structure in which it is substantially a fluid-dynamic locking and tightening pressure or, alternatively, a pneumatic pressure that is called to intervene, further to a compression spring that, however, does not contribute to the force with which the tool itself acts on the material being processed.

Figure 2:
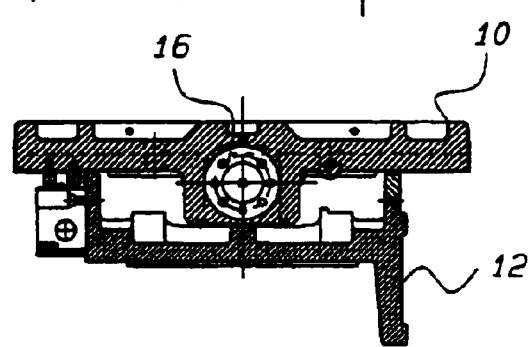
Figure 3:
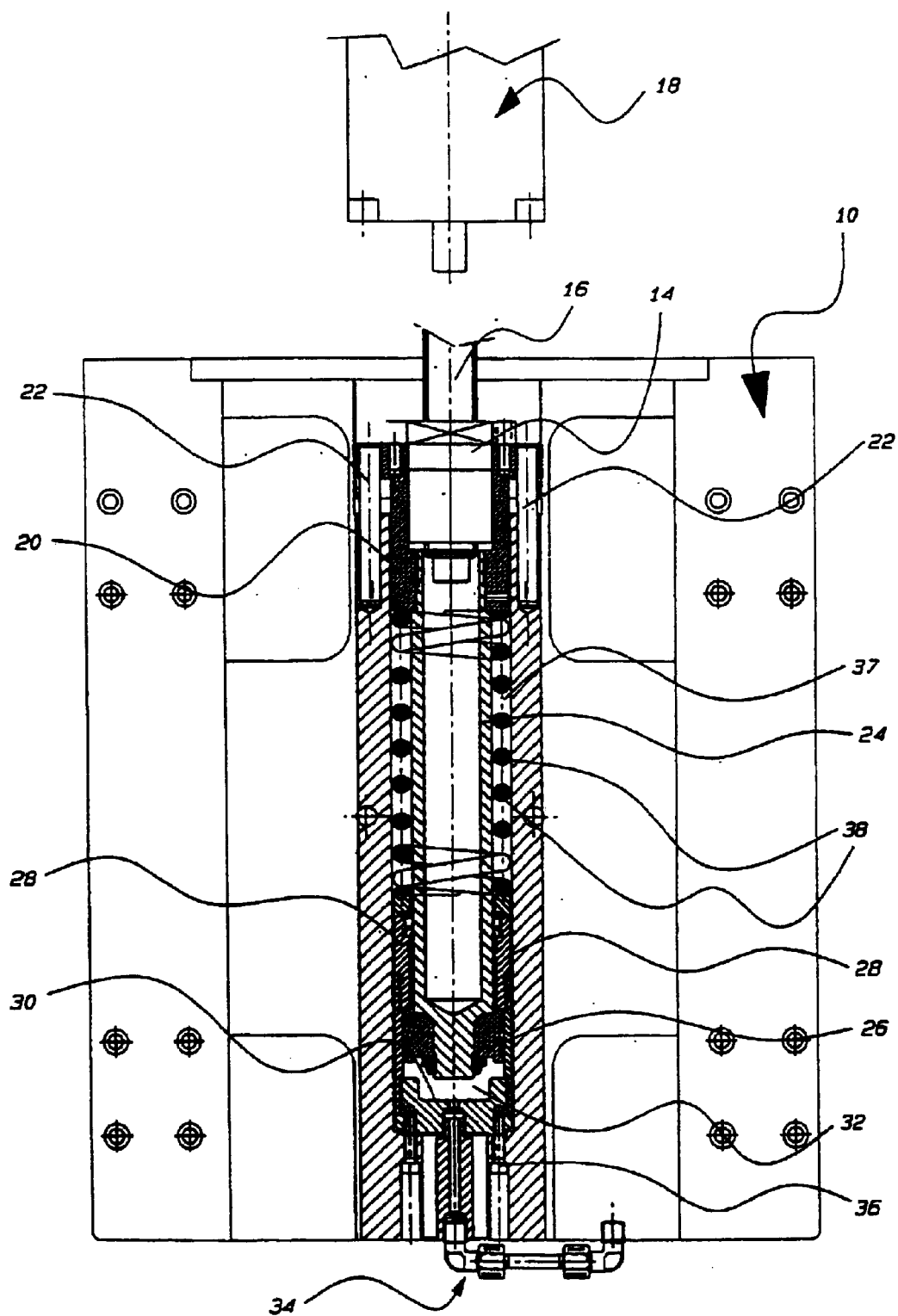
Figure 4:
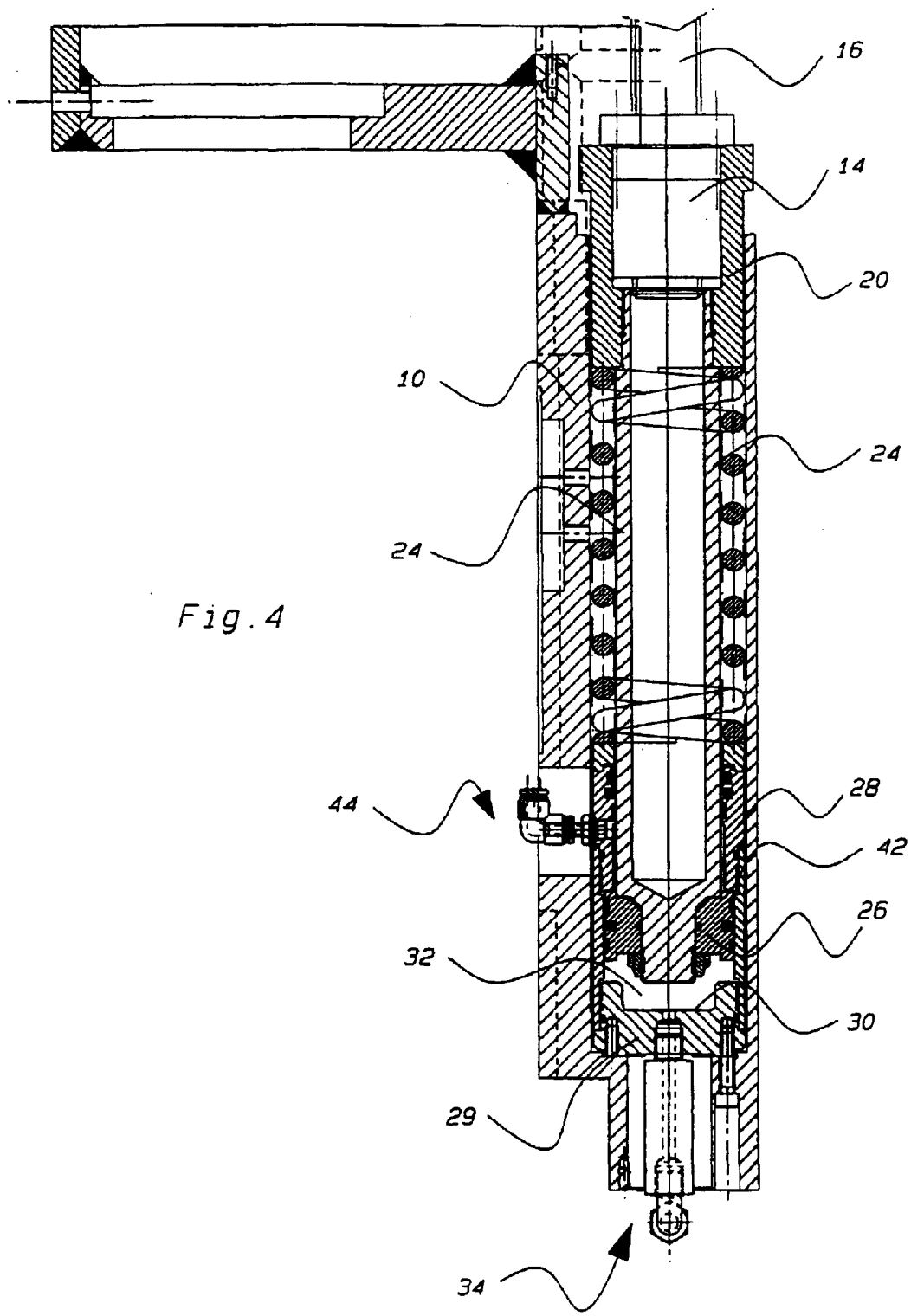
Figure 5:
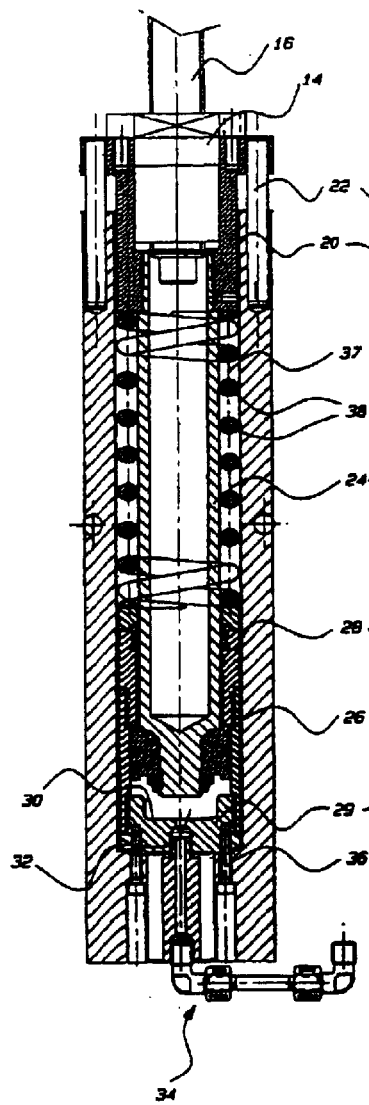
Figure 6:
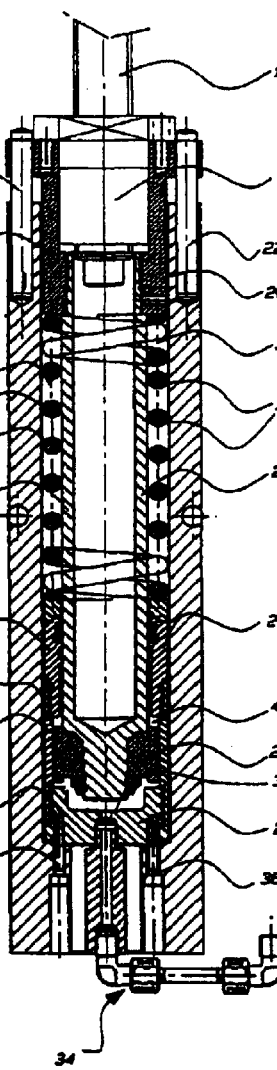
Figure 7:
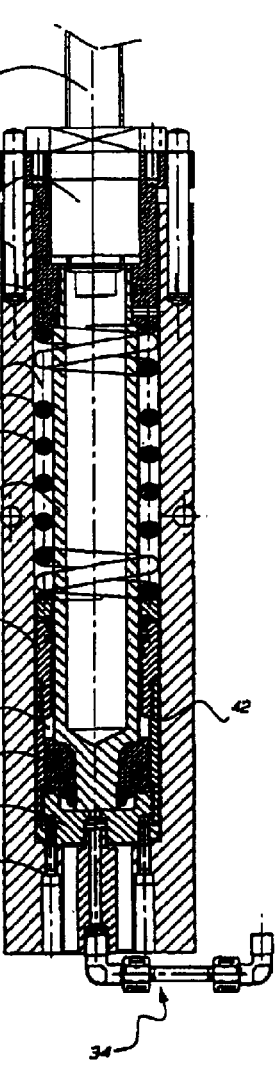

Anyway, features and advantages of the present invention will be more readily understood from the description of a preferred, although not sole embodiment of the present invention, which is given below by way of non-limiting example with reference to the accompanying drawings, in which:

FIGS. 1 and 2 are schematical, partially sectional views of a side elevation and the horizontal section, respectively, of the mandrel-holding slide or sleeve pod associated to the beam and carriage complex of a numerical-control machine tool of a traditional type;

FIGS. 3 an 4 are partially cross-sectional front and side views, respectively, of the mandrel-holding carriage for a numerical-control machine according to an embodiment of the present invention;

FIGS. 5, 6 and 7 are views similar to the central portion of FIG. 3, illustrating various positions of the parts that make up the mandrel-holding structure during operation.

In the following description, many of the parts that make up the mandrel-holding structure will only be described concisely, owing to them being components well-known to the art.

FIGS. 1 to 4 partially illustrate a mandrel-carrier structure which, in a manner that is well-known to the art, is adapted to slide along the beam 11 of the numerical-control machine tool, as associated to a mandrel-holding sleeve pod or slide 12.

In the inner tubular cavity of the structure 10 there is housed a nut screw 14 co-operating with a coaxial lead screw 16 attached to the sleeve pod 12 and adapted to be driven rotatably by an external motor 18.

The lead screw 16 determines the altitude or working position of the sleeve pod 12. The nut screw 14 is mounted coaxially, firmly joined thereto, in a bush or sleeve-like tube 20, in which guide pins 22 are engaged.

At the lower end portion of the nut screw 14 there is provided, firmly joined thereto, a tubular member 25, the lower end portion of which is firmly joined to a slidable appendix 26 in the shape of a plunger.

In the lower portion of the mandrel-carrier structure 10 there is rigidly fixed a cylindrical member 28 that has a bottom 29. The inner base 30 of said bottom 29 forms the bottom of a chamber 32 in which said plunger-like member 26 operates.

This chamber 32 is connected, via appropriate conduits, to a supply 34 of oil-pressure fluid.

The cylindrical member 28 is attached, rigidly joined thereto, to the mandrel-carrier structure 10 in correspondence of said bottom 29 with the aid of the fastening means (pins) 36.

Between the outer surface of the tubular member 24 and the inner surface of the mandrel-carrier structure 10 there is defined an annular hollow gap 37, in which there is accommodated a helical compression spring 38, the ends of which bear against the lower base of the sleeve-like tube 20 and the upper end of the cylindrical member 28, respectively.

Considering now the operation of the object of the present invention and, therefore, the mechanical adjustment device, it is appropriate for reference to be duly made also to FIGS. 5, 6 and 7, which, as already mentioned, illustrate the structure shown in FIGS. 1 through to 4 in the various working conditions.

When the motor 18 drives the lead screw, causing it to rotate, such a lead screw interacts with the nut screw 14 and, as a result, the sleeve pod 12 is raised or lowered according to the direction of rotation of the lead screw.

When the sleeve pod 12 is displaced axially, it defines, in combination with the plunger-shaped portion 26 of the tubular member 24, two mutually opposing chambers, one of which is the already mentioned chamber indicated at 32 in FIG. 3, while the other one, which can be seen in FIGS. 6 and 7, where it is situated above the plunger-shaped member 26, is indicated with the reference numeral 40.

By supplying the first chamber 32 with oil under pressure, the plunger-like appendix 26 is caused to rise and, while moving in this way upwards, it entrains the tubular member 24, the nut screw 14, the lead screw 16 and, then, the mandrel-holding sleeve pod or slide 12 with it, up to the point at which the plunger-like member comes into contact with the cylindrical member 28.

As a result, the cylindrical member 28 becomes firmly joined with the plunger-like member 26 and, similarly, the nut screw 14 becomes firmly joined with the structure 10, which represents a normal operating condition of numerical-control machine tools as illustrated in FIG. 5.

In fact, the sleeve pod 12 comes in this way to lie in a position which is fixed and pre-established in relation to the mandrel-carrier structure 10, without any variation that may be brought about automatically by variations in the thickness of the material being processed or by tool wear-down.

If on the contrary the kind of processing to be carried out involves polishing or smoothing the material, the connection between the chamber 32 and the source of supply of oil under pressure is in the first place cut off. As a result, the assembly formed by the plunger-like appendix 26, the tubular member 24, the nut screw 14 and the sleeve pod 12 lowers owing to its weight, and comes to rest against the surface 30 of the bottom 29, in the condition illustrated in FIG. 7. At the same time, the spring 38 is slightly compressed.

This downward movement of the plunger-like member 26 has also the effect of determining the formation of the second chamber 40, which is an annular chamber defined between the upper projecting surface of the plunger-like member 26 and the abutment shoulder 42 formed on the tubular member 28.

This chamber 40 is then supplied, via the conduit 44 that is to such a purpose appropriately provided with control and check valves, with air under pressure, so that the plunger-like member 26 is kept abutting against the bottom surface 30.

In this condition, the motor 18 driving the lead screw 16 is operated so as to cause the sleeve pod 12 to lower by a pre-determined distance (in the order of a few millimetres).

Since the polishing or smoothing tool is in contact with the material to be processed, neither the sleeve pod 12 nor the lead screw 16 are in a position as to translate, i.e. move downwards, so that the assembly formed by the plunger-like appendix 26, the tubular member 24 and the nut screw 14 is forced to move upwards, thereby changing from the condition illustrated in FIG. 7 to the condition illustrated in FIG. 6.

It can be readily appreciated that to a screwing-in of the lead screw 16, which brings about a downward movement, there corresponds an equal upward movement of the nut screw 14, in such a manner as to ensure that the tool keeps constantly in contact with the surface of the material being processed.

In this situation, the sleeve pod is therefore subject to following forces:
(i) the force that is brought about by the pneumatic pressure prevailing in the chamber 40, which has the effect of pressing the plunger-like appendix 26 downwards, so that it practically pushes downwards the whole assembly formed by the tubular member 24, the nut screw 14, the lead screw 16 and the sleeve pod 12;
(ii) the force that is brought about by the spring 38 which, owing to its being anyway in a compressed condition, pushes upwards, and therefore in the opposite direction, the nut screw 15 and, therefore, the lead screw 16 jointly with the sleeve pod 12;
(iii) the weight of the sleeve pod assembly (i.e. to be understood as including the overall weight of the sleeve pod 12 itself, the nut screw 14, the lead screw 16 and the tubular member 24), which clearly acts as a force directed downwards.

If the extent of compression of the spring is pre-set so as to counter-balance the weight of the sleeve pod 12, then the force with which the polishing or smoothing tool presses against the material being processed will be the one that is due to the pneumatic pressure acting in the chamber 40, the value of which can be suitably varied according to the actual processing needs, as this is true in the ordinary polishing or smoothing machines, i.e. those machines that do not fall within the category of numerical-control machine tools.

Even if during processing the length of the spring undergoes slight variations, so that also the extent of compression thereof is changed, these will in any case be just very small and substantially unimportant variations as compared with the main and controlled action exerted by the pneumatic pressure in the chamber 40.

If the dish-like tool comes across a portion of material having a larger thickness during a polishing or smoothing process, the sleeve pod 12, jointly with the lead screw 16, the nut screw 14 and the plunger-like member 26, are practically forced into raising, and this leads to an extension of the spring 38.

However, the corresponding variation in the force acting on the polishing or smoothing tool is negligible (since the difference between the force of the pneumatic pressure, the weight of the mandrel and the force of compression exerted by the spring does not vary to any appreciable extent) and, therefore, the pressure exerted on the material being polished remains unvaried.

If on the contrary the thickness of the material decreases, there occurs a lowering of the sleeve pod 12, jointly with the lead screw 16, the nut screw 14 and the plunger-like member 26, down to the point at which the tool comes again into contact with the material to be polished or smoothed, while the spring 38 shortens slightly. Anyway, even in this case the pressure exerted by the tool on the material being processed remains substantially unvaried owing to the same reasons as explained above.

From the considerations that have been set forth above, it clearly emerges that the possibility is created by the present invention for the pressure exerted by the dish-like tool on the material being processed to remain substantially constant, even if variations in the thickness of the material being processed are encountered.

The same situation comes to apply in the case of a wear-down of the tool, so that even when the tool undergoes gradual wear-down, i.e. wears off gradually, the pressure exerted by it on the material being processed remains substantially unvaried or, at worst, varies to a fully negligible extent.

Based on what has been set forth above it can be readily appreciated how the present invention enables:
(i) stone material to be submitted to specific kinds of processes or treatments with the use of numerical-control machines, instead of the traditional polishing or smoothing machines; and
(ii) at the same time, traditional polishing and smoothing tool-carrying chucks or dishes to be used.

Such a result is achieved thanks to the solution of the invention, in which:
(a) the lead screw and nut screw mechanism for the adjustment of the height of the mandrel-holding sleeve pod is not directly attached to the mandrel carriage structure;
(b) a compression spring exerts a force adapted to compensate for the overall weight of the sleeve pod and the members associated thereto, so that the pressure exerted by the tool on the material being processed always corresponds to the pneumatic pressure being supplied so that such a force is directed downwards.

It will be appreciated that, in the practical implementation of the present invention, a number of conceptually and mechanically equivalent modifications and variants can be derived and worked out by those skilled in the art in accordance with and within the afore illustrated features, without departing from the scope of the invention as defined by the appended claims.

What is claimed is:

1. Mandrel-holding slide or sleeve pod for a numerical-control machine tool, slidably mounted by means of a carriage on to a beam of the machine tool, in which the position of said slide or sleeve pod is adjustable vertically by means of a lead screw (16) and nut screw (14) mechanism, comprising a mandrel-carrier structure (10) in which there is at least partially housed said lead screw and nut screw mechanism, characterized in that in said mandrel-carrier structure there is mounted an axially slidable plunger-like member (26) adapted to define first and second chambers (40 and 32) situated above and below said plunger-like member (26), respectively, said second chamber (32) being adapted to be communicatingly connected with a supply source of an oil-pressure fluid at a pre-determined pressure, and said first chamber (40) being adapted to be communicatingly connected with a supply source of compressed air at a pre-determined pressure, said plunger-like member (26) being subject to the action of a counter compression spring (38) calibrated at such a pre-determined upward-directed elastic force as to be able to compensate for the weight of the sleeve pod or slide (12), said supply source of oil-pressure fluid being activated when the mandrel-holding slide must take the rigidly locked, non-floating normal working condition of the numerical-control machine tool, whereas said supply source of air under pressure is activated when said slide or sleeve pod (12) must take the floating condition in which a planar surface of a stone material is processed, in which to the mandrel of the machine tool there is mounted a tool-carrying chuck or dish of a type traditionally used in polishing, smoothing and facing machines for stone material.

2. Mandrel-holding slide or sleeve pod according to claim 1, comprising a cylindrical member (28) firmly joined to said mandrel-carrier structure (10) and terminating in a bottom (29), a tubular member (24) firmly joined to said nut screw (14), said plunger-like member (26) being provided slidably inside said tubular member (24), and joined thereto, so as to co-operate with said cylindrical member (28), whereby said second chamber (32) is defined between the bottom of said plunger-like member (26) and said bottom (29) of said cylindrical member (28) and said first chamber (40) is defined between said plunger-like member (26) and a lower shoulder (42) of said cylindrical member (28), said compression spring (38) being housed in a hollow space (37) defined between the inner surface of said mandrel-carrier structure (10) and the outer surface of said tubular member (24), said spring being engaged at the end portions thereof against the lower surface of a bush (20) and against the upper surface of said cylindrical member (28), respectively.

3. Mandrel-holding slide or sleeve pod according to claim 2, characterized in that said compression spring (38) is pre-loaded so as to exert a force equal to the overall weight force of said sleeve pod (12), said lead screw (16), said nut screw (14) and said tubular member (24).

* * * * *